(12) United States Patent
Xie et al.

(10) Patent No.: US 10,951,438 B1
(45) Date of Patent: Mar. 16, 2021

(54) ACCELERATION PROXY DEVICE, ACCELERATION PROXY METHOD, AND CONTENT MANAGEMENT SYSTEM

(71) Applicant: WANGSU SCIENCE & TECHNOLOGY CO., LTD., Shanghai (CN)

(72) Inventors: Wenwei Xie, Shanghai (CN); Jianying Lin, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 526 days.

(21) Appl. No.: 16/062,961

(22) PCT Filed: Jul. 13, 2017

(86) PCT No.: PCT/CN2017/092756
§ 371 (c)(1),
(2) Date: Jun. 15, 2018

(87) PCT Pub. No.: WO2018/223488
PCT Pub. Date: Dec. 13, 2018

(30) Foreign Application Priority Data

Jun. 8, 2017 (CN) .......................... 201710428820.4

(51) Int. Cl.
*H04L 12/46* (2006.01)
*H04L 29/12* (2006.01)
*H04L 29/08* (2006.01)

(52) U.S. Cl.
CPC ...... *H04L 12/4625* (2013.01); *H04L 12/4641* (2013.01); *H04L 61/2007* (2013.01); *H04L 67/28* (2013.01); *H04L 61/2521* (2013.01)

(58) Field of Classification Search
CPC ............. H04L 12/4625; H04L 12/4641; H04L 61/2007; H04L 67/28
(Continued)

(56) References Cited

U.S. PATENT DOCUMENTS

| 8,194,674 | B1 * | 6/2012 | Pagel | .................. H04L 61/2535 370/393 |
| 2007/0168288 | A1 * | 7/2007 | Bozeman | ............. G06Q 20/382 705/51 |

(Continued)

FOREIGN PATENT DOCUMENTS

| CN | 102710485 A | 10/2012 |
| CN | 103248569 A | 8/2013 |

(Continued)

OTHER PUBLICATIONS

The China National Intelleectual Property Administration (CNIPA) The China Search Report for 2017104288204 dated May 28, 2019 14 Pages.

(Continued)

*Primary Examiner* — Peter G Solinsky
(74) *Attorney, Agent, or Firm* — Anova Law Group, PLLC

(57) ABSTRACT

An acceleration proxy device includes a network module, an application acceleration module, and a strategy routing module. The network module includes at least one bridge, and each bridge is associated with an IP address segment. The strategy routing module stores routing tables of the at least one bridge, and a routing table of each bridge includes a gateway corresponding to the bridge.

15 Claims, 3 Drawing Sheets

(58) Field of Classification Search
USPC .......................................................... 370/254
See application file for complete search history.

(56) References Cited

U.S. PATENT DOCUMENTS

2011/0153722 A1* 6/2011 Choudhary ......... H04L 67/2814
709/203
2011/0277026 A1* 11/2011 Agarwal ............. H04L 63/0815
726/8

FOREIGN PATENT DOCUMENTS

| CN | 103428095 A | 12/2013 |
|---|---|---|
| CN | 103763407 A | 4/2014 |
| CN | 104994137 A | 10/2015 |
| CN | 105490910 A | 4/2016 |
| CN | 105530185 A | 4/2016 |
| EP | 1394998 A2 | 3/2004 |

OTHER PUBLICATIONS

The European Patent Office (EPO) The Extended European Search Report for 17900277.9 (PCT/CN2017/092756) Mar. 22, 2019 12 Pages.

* cited by examiner

ACCELERATION PROXY DEVICE, ACCELERATION PROXY METHOD, AND CONTENT MANAGEMENT SYSTEM

CROSS-REFERENCES TO RELATED APPLICATIONS

This application is a national phase entry under 35 U.S.C § 371 of International Application No. PCT/CN2017/092756, filed on Jul. 13, 2017, which claims priority of Chinese Patent Application No. 201710428820.4, filed with the State Intellectual Property Office of P. R. China on Jun. 8, 2017, the entire contents of all of which are incorporated herein by reference.

FIELD OF THE DISCLOSURE

The present disclosure relates to the technical field of Internet and, more particularly, relates to an acceleration proxy device, an acceleration proxy method, and a content management system.

BACKGROUND

In existing network deployment, VLAN (Virtual Local Area Network) is a commonly used technology. In the routing/switching field, a forwarding port of the VLAN is known as a trunk port. The trunk technology allows interconnection between switches, such that different VLANs communicate with the same VLAN in other switches through shared links. Currently, to provide services such as caching response and optimizing back-to-source links upon user's request, an acceleration proxy device often needs to be introduced into the network. The acceleration proxy devices are often deployed at the uplink of a core switch of a client network environment and at the downlink of a network address translation (NAT) device.

When the core switch is connected to the NAT device through the trunk port, the existing acceleration proxy device shows following drawbacks:

because of various aspects of reasons such as not supporting the bridge of multiple VLANs, the back-to-source address of the application layer being determined by the system, and not supporting the multi-segment routing, the existing acceleration proxy device cannot be deployed at the trunk circuit. Accordingly, the existing acceleration proxy device does not support the traverse of multiple VLANs. Further, if the acceleration proxy device is deployed at the uplink of the NAT device, because the safeguard of the client is often deployed at the NAT device, the acceleration proxy device needs to bear the safety risk. As such, the existing acceleration proxy device cannot be well integrated with the VLAN technology.

BRIEF SUMMARY OF THE DISCLOSURE

To solve issues in existing technologies, embodiments of the present disclosure provide an acceleration proxy device, an acceleration proxy method, and a content management system. The technical solutions are as follows:

In one aspect, an acceleration proxy device is provided, and the acceleration proxy device includes a network module, an application acceleration module, and a strategy routing module. The network module includes at least one bridge, and each bridge is associated with an IP address segment. The strategy routing module stores routing tables of the at least one bridge, and the routing table of each bridge includes a gateway corresponding to the bridge. The network module is configured to receive an access request from a target IP address segment through a target bridge, and to forward the access request to the application acceleration module. The application acceleration module is configured to bind and set an IP address of the target bridge as a source IP address of the access request and forward the access request that is bound with the source IP address. The strategy routing module is configured to query a target gateway corresponding to the access request bound with the source IP address, and send the access request bound with the source IP address to the target gateway through the network module, such that the access request bound with the source IP address can be sent to a server through the target gateway.

Further, the acceleration proxy device is configured in a trunk link between a switch and a network address translation (NAT) device.

Further, the network module is a local area network module used in a VLAN environment.

Further, the network module is also configured to remove a local area network identity carried in the access request, and to forward the access request with removed local area network identity to the application acceleration module.

Further, the network module is also configured to receive the access request bound with the source IP address sent by the strategy routing module, add the local area network identity to the access request bound with the source IP address for sending to the target gateway.

Further, the network module is also configured to receive response data fed back by the server, and forward the response data to the application acceleration module, where the response data carries a destination IP address;

the application acceleration module is configured to forward the response data to a user to which the destination IP address points.

the strategy routing module is configured to query a bridge to which the destination IP address corresponds, and send the response data to the user through the queried bridge.

Further, the network module is also configured to remove the local area network identity carried in the response data, and forward the response data with removed local area network identity to the application acceleration module.

Further, the network module is also configured to receive the response data sent by the strategy routing module, and add the local area network identity to the response data for sending to the user.

In another aspect, a content management system is provided, including the aforementioned acceleration proxy device.

In another aspect, an acceleration proxy method is provided, and the method includes:

receiving, by a network module, an access request from a target IP address segment through a target bridge, and forwarding, by the network module, the access request to an application acceleration module;

binding and setting, by the application acceleration module, an IP address of the target bridge as a source IP address of the access request, and forwarding, by the application acceleration module, the access request bound with the source IP address;

querying, by a strategy routing module, a target gateway corresponding to the access request bound with the source IP address, and sending, by the strategy routing module, the access request bound with the source IP address to the target gateway through the network module, thereby sending the access request bound with the source IP address to a server through the target gateway.

Further, the method also includes:

using a local area network module in a VLAN environment as the network module, removing a local area network identity carried in the access request, and forwarding the access request with removed local area network identity to the application acceleration module.

Further, the method also includes:

receiving, by the network module, the access request bound with the source IP address sent by the strategy routing module, and adding the local area network identity to the access request bound with the source IP address for sending to the target gateway.

Further, the method also includes:

receiving, by the network module, response data fed back by the server, and forwarding, by the network module, the response data to the application acceleration module, where the response data carries a destination IP address;

forwarding, by the application acceleration module, the response data to a user to which the destination IP address points;

querying, by the strategy routing module, a bridge corresponding to the destination IP address, and sending, by the strategy routing module, the response data to the user through the queried bridge.

In another aspect, a content management system is provided. The content management system includes a memory, and instructions stored in the memory are configured to execute the aforementioned acceleration proxy methods.

In another aspect, a content management system is provided. The content management system includes a processor, and the processor is configured to execute the aforementioned acceleration proxy methods.

Beneficial effects brought about by technical solutions of the present disclosure include: the disclosed network module may respectively provide corresponding bridges to local area networks from different IP address segments. Accordingly, when the application acceleration module sends out an access request of a user, the IP address of the corresponding bridge may be bound and set as the source IP address of the access request based on the IP address segment that the access request is from. Through the strategy routing module, default gateways corresponding to each bridge may be determined. Thus, based on the source IP address in the access request, the gateway that sends the access request is queried, such that the access request can be sent to the server through the queried gateway. Further, after receiving the response data fed back by the server, based on the destination IP address in the response data, the bridge corresponding to the destination IP address may be queried through the strategy routing module. Accordingly, the response data may be sent to the user through a connected route of the bridge. As such, the acceleration proxy device, the acceleration proxy method, and the content management system provided by the present disclosure can be deployed in the trunk link, to integrate with the current VLAN technology. Accordingly, the network adaptive capability of the transparent proxying function of the device is enhanced.

BRIEF DESCRIPTION OF THE DRAWINGS

To more clearly illustrate technical solutions of the present disclosure, accompanying drawings used in descriptions of embodiments hereinbelow are introduced briefly. Obviously, the accompanying drawings described hereinafter are only some embodiments of the present disclosure, and for those ordinarily skilled in the relevant art, other drawings may be obtained from these accompanying drawings without creative labor.

DETAILED DESCRIPTION

To make the objective, technical solutions and advantages of the present disclosure clearer, embodiments of the present disclosure are described in more details with reference to the accompanying drawings.

Embodiment 1

Figure 1:
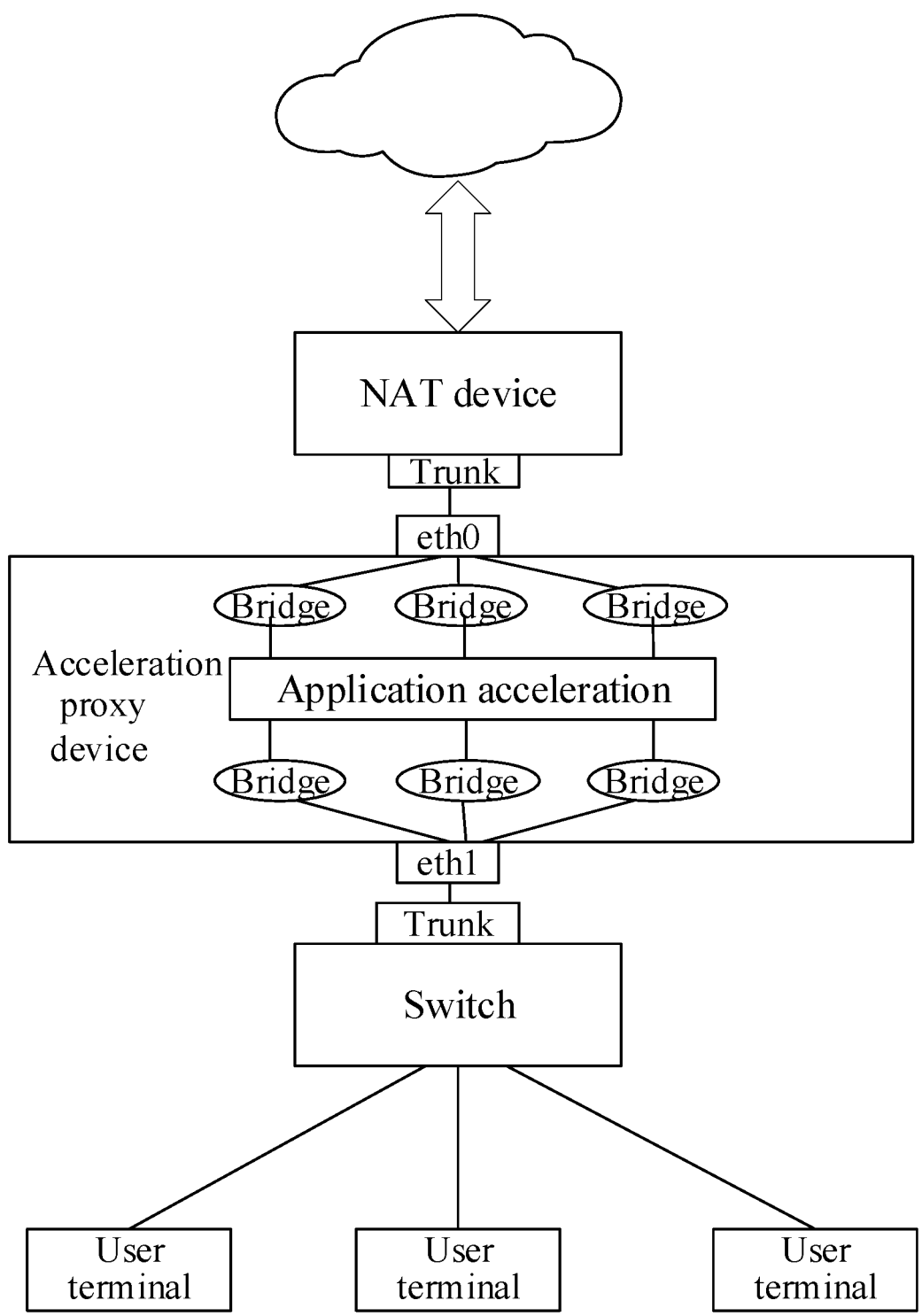
FIG. 1 illustrates a schematic view of network topology according to Embodiment 1 of the present disclosure.

Embodiments of the present disclosure provide an acceleration proxy device and a content management system having the acceleration proxy device. Referring to FIG. 1, the acceleration proxy device may be located at a trunk link between a switch and a network address translation (NAT) device. The switch and the NAT device may each include a trunk interface, and a trunk link may be formed between the two trunk interfaces. The acceleration proxy device may include a pair of physical network cards eth0 and eth1, and the two physical network cards may respectively perform data interaction with the switch or the NAT device.

Figure 2:
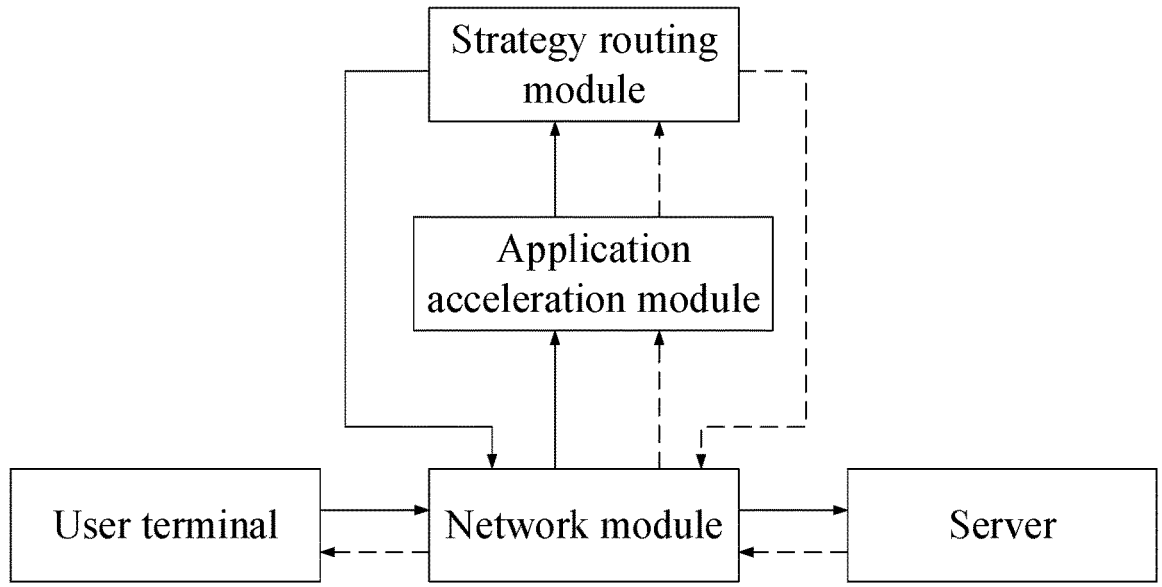
FIG. 2 illustrates a structural schematic view of a content management system having an acceleration proxy device according to Embodiment 1 of the present disclosure.
Figure 3:
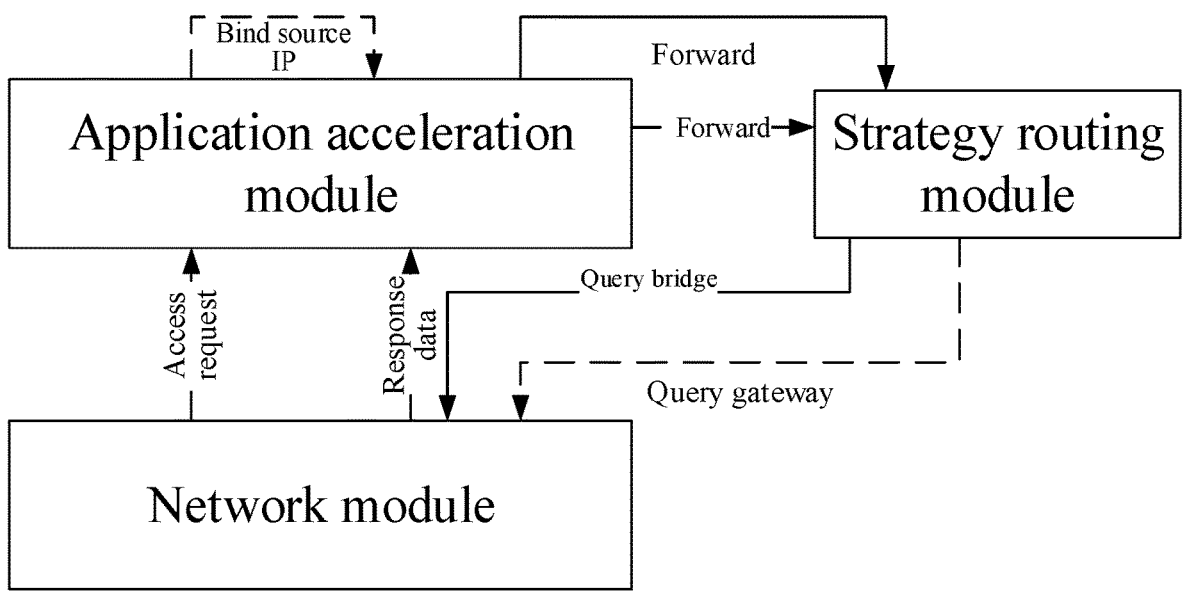
FIG. 3 illustrates an interaction schematic view of each module in an acceleration proxy device according to Embodiment 1 of the present disclosure.

Referring to FIG. 1~FIG. 3, in one embodiment, the acceleration proxy device may include a network module, an application acceleration module, and a strategy routing module. The network module may be a local area network module, e.g., a virtual local area network (VLAN) module, including at least one bridge, where each bridge is associated with an IP address segment. The strategy routing module stores routing tables of the at least one bridge, and the routing table of each bridge includes a gateway corresponding to the bridge. That is, the VLAN module may create a plurality of bridges, and each bridge may correspond to one VLAN. As such, each bridge is associated with the IP address segment of the VLAN, thereby achieving the same effect as the trunk link. That is, a plurality of VLANs may share one physical link.

More specifically, in one embodiment, for each VLAN, the VLAN module may create two virtual network cards, and may bridge the created virtual network cards to a bridge. For example, for the VLAN with a VLAN identity of 101, the IP address segment of the VLAN may be 192.168.1.0/24, and two virtual network cards eth0.101 and eth1.101 may be respectively created at the physical network cards eth0 and eth1. The two virtual network cards may be bridged to a bridge br_vlan101. Further, the bridge br_vlan101 may be configured with a bridge IP 192.168.1.2, and the bridge may be configured with a default gateway 192.168.1.1. The aforementioned correspondence relationship between the bridge and the gateway may be stored as a routing table in the strategy routing module.

In one embodiment, the network module may receive an access request from a target IP address segment through a target bridge, and forward the access request to the application acceleration module. Given the VLAN with a VLAN identity of 101 as an example, the IP address segment of the VLAN 101, i.e., 192.168.1.0/24, may be treated as the target IP address segment, and the bridge br_vlan101 to which the VLAN 101 corresponds may be used as the target bridge. Thus, all user access requests from the VLAN 101 may be received by the bridge br_vlan101. After the bridge br_vlan101 receives an access request, the access request may be sent to the application acceleration module. The access request may include a local area network identity and a source IP address of a user that sends the access request. In practical application process, the local area network identity needs to be removed from all data sent to the application layer. Accordingly, the network module may be further configured to remove the local area network identity carried in the access request, and forward the access request with removed local area network identity to the application acceleration module.

In one embodiment, the application acceleration module may bind and set an IP address of the target bridge as a source IP address of the access request and forward the access request bound with the source IP address. For example, after the application acceleration module receives the access request, it may be determined that the source IP address in the access request belongs to the segment 192.168.1.0/24. Further, the IP address of the target bridge to which this segment corresponds may be used as the source IP address to be bounded to the access request. Accordingly, the source IP address of the access request is the IP address of the bridge br_vlan101, i.e., 192.168.1.2. After the source IP address is bound to the access request, the application acceleration module may forward the access request outwards.

After the access request is forwarded, the strategy routing module may query a target gateway corresponding to the access request bound with the source IP address. For example, in the routing table, the correspondence relationship between the IP address of the bridge and the IP address of the gateway may be recorded. As such, for the bridge IP address 192.168.1.2, the IP address of the corresponding gateway may be 192.168.1.1. Thus, after the target gateway is queried, the access request bound with the source IP address may be sent to the target gateway through the network module, such that the access request bound with the source IP address may be further sent to a server through the gateway.

In practical application process, when the network module sends the access request, a corresponding local area network identity may be added into the access request. That is, the network module may receive the access request bound with the source IP address sent by the strategy routing module, and add the local area network identity to the access request bound with the source IP address for sending to the target gateway. The local area network identity described here may be the same as the previously removed local area network identity, for example, they may be both VLAN 101.

In one embodiment, the server may respond to the received access request and feed back response data to the acceleration proxy device. When feeding back the response data, the server may use the source IP address in the access request as a destination IP address of the response data, thereby sending response data to the destination IP address. As described above, the source IP address in the access request is bound and set as the IP address of the bridge by the application acceleration module. Thus, the destination IP address of the response data is used as the IP address of the bridge. For example, the destination IP address may be the IP address of the bridge br_vlan101, i.e., 192.168.1.2. Further, the aforementioned access request may include, other than the bound source IP address, an IP address of the user that sends the access request. Thus, the response data may similarly include the IP address of the user.

In one embodiment, the network module may receive the response data fed back by the server, and forward the response data to the application acceleration module, where the response data carries the destination IP address. When the response data is forwarded to the application acceleration module, the network module may remove the local area network identity carried in the response data. For example, the VLAN 101 may be removed. Further, the response data with removed local area network identity may be forwarded to the application acceleration module.

In one embodiment, the application acceleration module may, based on the destination IP address carried in the response data, forward the response data to the destination IP address through the strategy routing module. After the response data is forwarded, the strategy routing module may query the bridge to which the destination IP address corresponds, and send the response data to the user through the queried bridge. More specifically, the routing table may record the IP address of each bridge. Thus, the strategy routing module may query to obtain that the corresponding bridge is br_vlan101 based on the destination IP address 192.168.1.2. Accordingly, the strategy routing module may send the response data to the terminal to which the user IP address points through the connected route. It should be noted that, in practical application scenarios, the response data sent by the application acceleration module is data with removed local area network identity. Thus, after receiving the response data sent by the strategy routing module, the bridge in the network module may add the local area network identity to the response data for sending to the user.

Embodiment 2

Figure 4:
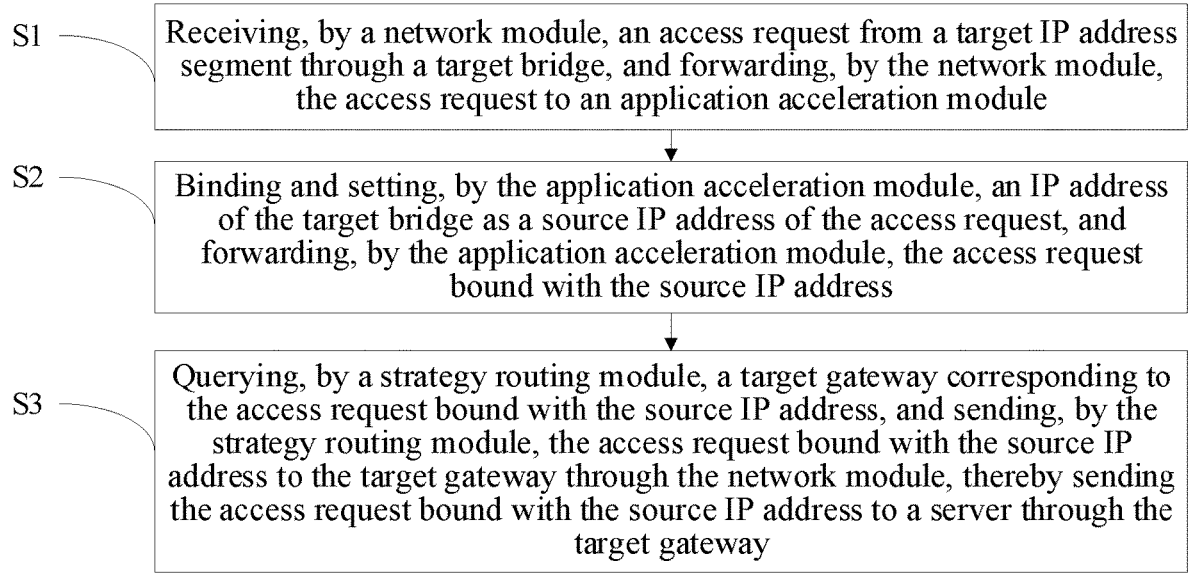
FIG. 4 illustrates a flow chart of an acceleration proxy method according to Embodiment 2 of the present disclosure.

Referring to FIG. 4, the present disclosure further provides an acceleration proxy method, and the method includes:

S1: receiving, by a network module, an access request from a target IP address segment through a target bridge, and forwarding, by the network module, the access request to an application acceleration module;

S2: binding and setting, by the application acceleration module, an IP address of the target bridge as a source IP address of the access request, and forwarding, by the application acceleration module, the access request bound with the source IP address;

S3: querying, by a strategy routing module, a target gateway corresponding to the access request bound with the source IP address, and sending, by the strategy routing module, the access request bound with the source IP address to the target gateway through the network module, thereby sending the access request bound with the source IP address to a server through the target gateway.

In one embodiment, the method further includes:
using a local area network module in a VLAN environment as the network module, removing a local area network identity carried in the access request, and forwarding the access request with removed local area network identity to the application acceleration module.

In one embodiment, the method further includes:
receiving, by the network module, the access request bound with the source IP address sent by the strategy routing module, and adding the local area network identity to the access request bound with the source IP address for sending to the target gateway.

In one embodiment, the method further includes:

receiving, by the network module, response data fed back by the server, and forwarding, by the network module, the response data to the application acceleration module, where the response data carries a destination IP address;

forwarding, by the application acceleration module, the response data to a user to which the destination IP address points;

querying, by the strategy routing module, a bridge corresponding to the destination IP address, and sending, by the strategy routing module, the response data to the user through the queried bridge.

Embodiment 3

The present disclosure further provides a content management system. The content management system includes a memory, and instructions stored in the memory are configured to execute the aforementioned acceleration proxy method.

The present disclosure further provides a content management system. The content management system includes a processor, and the processor is configured to execute the aforementioned acceleration proxy method.

In one embodiment, the memory may be a storage device for storing information. In a digital system, the device that stores binary data may be a memory. In an integrated circuit, a circuit without practical form but having a storage function may also be a memory, such as random access memory (RAM), and first-input-first-output (FIFO). In a system, the memory device having a practical form may be called a memory, such as a memory bank and a trans-flash (TF) card.

The processor may be implemented by any appropriate form. For example, the processor may be in a form of micro-processor or processor, or a computer-readable medium that stores computer-readable program codes (e.g., software or firmware) executable by the (micro-) processor, a logical gate, a switch, an application specific integrated circuit (ASIC), a programmable logic controller, and an embedded micro-controller, etc. The present disclosure is not limited thereto.

As such, beneficial effects brought about by technical solutions of the present disclosure include: the disclosed network module may respectively provide corresponding bridges to local area networks from different IP address segments. Accordingly, when the application acceleration module sends out an access request of a user, the IP address of the corresponding bridge may be bound and set as the source IP address of the access request based on the IP address segment that the access request is from. Through the strategy routing module, default gateways corresponding to each bridge may be determined. Thus, based on the source IP address in the access request, the gateway that sends the access request is queried, such that the access request may be sent to the server through the queried gateway. Further, after receiving the response data fed back by the server, based on the destination IP address in the response data, the bridge corresponding to the destination IP address may be queried through the strategy routing module. Accordingly, the response data may be sent to the user through a directly connected route of the bridge. As such, the acceleration proxy device, the acceleration proxy method, and the content management system provided by the present disclosure may be deployed in the trunk link, to integrate with the current VLAN technology. Accordingly, the network adaptive capability of the transparent proxying function of the device is enhanced.

Sequence numbers of aforementioned embodiments of the present disclosure are merely for descriptive purposes, and do not represent any preference of the disclosed embodiments.

The system embodiments described above are merely for illustrative purpose. The units described as separated parts may or may not be physically detached. The parts displayed as units may or may not be physical units, i.e., may be located at one place, or distributed at a plurality of network units. Based on the actual needs, a part or all of the modules may be selected to achieve the objective of the embodiments. Those ordinarily skilled in the art may understand and implement the disclosed embodiments without contributing creative labor.

Through the descriptions of various aforementioned embodiments, those skilled in the art may clearly understand that the embodiments may be implemented by means of software in conjunction with an essential common hardware platform, or may be simply implemented by hardware. Based on such understanding, the essential part of the aforementioned technical solutions or the part that contribute to the prior art may be embodied in the form of software products. The software products may be stored in computer readable storage media, such as ROM/RAM, magnetic disk, and optical disk, etc., and may include a plurality of instructions to enable a computer device (may be a personal computer, a server, or a network device) to execute the methods described in various embodiments or parts of the embodiments.

The foregoing are merely certain preferred embodiments of the present disclosure, and are not intended to limit the present disclosure. Without departing from the spirit and principles of the present disclosure, any modifications, equivalent substitutions, and improvements, etc. shall fall within the scope of the present disclosure.

What is claimed is:

1. An acceleration proxy device, comprising:
   a network module,
   an application acceleration module, and
   a strategy routing module,
   wherein the network module includes at least one bridge, each bridge is associated with an IP address segment, the strategy routing module stores routing tables of the at least one bridge, and a routing table of each bridge includes a gateway corresponding to the bridge,
   the network module is configured to receive an access request from a target IP address segment through a target bridge and forward the access request to the application acceleration module,
   the application acceleration module is configured to bind and set an IP address of the target bridge as a source IP address of the access request and forward the access request bound with the source IP address, and
   the strategy routing module is configured to query a target gateway corresponding to the access request bound with the source IP address, and to send the access request bound with the source IP address to the target gateway through the network module, such that the access request bound with the source IP address is sent to a server through the target gateway.

2. The acceleration proxy device according to claim 1, wherein:

the acceleration proxy device is configured in a trunk link between a switch and a network address translation (NAT) device.

3. The acceleration proxy device according to claim 1, wherein:
the network module is a local area network module used in a VLAN environment.

4. The acceleration proxy device according to claim 3, wherein:
the network module is further configured to remove a local area network identity carried in the access request, and to forward the access request with removed local area network identity to the application acceleration module.

5. The acceleration proxy device according to claim 4, wherein:
the network module is further configured to receive the access request bound with the source IP address sent by the strategy routing module, and to add the local area network identity to the access request bound with the source IP address for sending to the target gateway.

6. The acceleration proxy device according to claim 1, wherein:
the network module is further configured to receive response data fed back by the server, and to forward the response data to the application acceleration module, wherein the response data carries a destination IP address;
the application acceleration module is configured to forward the response data to a user to which the destination IP address points;
the strategy routing module is configured to query a bridge to which the destination IP address corresponds, and to send the response data to the user through the queried bridge.

7. The acceleration proxy device according to claim 6, wherein:
the network module is further configured to remove a local area network identity carried in the response data, and to forward the response data with removed local area network identity to the application acceleration module.

8. The acceleration proxy device according to claim 7, wherein:
the network module is further configured to receive the response data sent by the strategy routing module, and to add the local area network identity to the response data for sending to the user.

9. A content management system according to claim 1, wherein:
the content management system includes the acceleration proxy device.

10. An acceleration proxy method, comprising:
receiving, by a network module, an access request from a target IP address segment through a target bridge, and forwarding, by the network module, the access request to an application acceleration module;
binding and setting, by the application acceleration module, an IP address of the target bridge as a source IP address of the access request, and forwarding, by the application acceleration module, the access request bound with the source IP address;
querying, by the strategy routing module, a target gateway corresponding to the access request bound with the source IP address, and sending, by the strategy routing module, the access request bound with the source IP address to the target gateway through the network module, thereby sending the access request bound with the source IP address to a server through the target gateway.

11. The acceleration proxy method according to claim 10, further comprising:
using a local area network module in a VLAN environment as the network module,
removing a local area network identity carried in the access request, and
forwarding the access request with removed local area network identity to the application acceleration module.

12. The acceleration proxy method according to claim 11, further comprising:
receiving, by the network module, the access request bound with the source IP address sent by the strategy routing module, and
adding, by the network module, the local area network identity to the access request bound with the source IP address for sending to the target gateway.

13. The acceleration proxy method according to claim 10, further comprising:
receiving, by the network module, response data fed back by the server, and forwarding, by the network module, the response data to the application acceleration module, wherein the response data carries a destination IP address;
forwarding, by the application acceleration module, the response data to a user to which the destination IP address points;
querying, by the strategy routing module, a bridge corresponding to the destination IP address, and sending, by the strategy routing module, the response data to the user through the queried bridge.

14. A content management system according to claim 10, comprising
a memory,
wherein instructions stored in the memory are configured to execute the acceleration proxy method.

15. A content management system according to claim 10, comprising:
a processor,
wherein the processor is configured to execute the acceleration proxy method.

* * * * *